United States Patent
Salomon et al.

(10) Patent No.: US 12,281,041 B2
(45) Date of Patent: Apr. 22, 2025

(54) BINDING COMPOUND BASED ON FURAN RESIN, REDUCING SUGAR AND/OR NON-REDUCING SUGAR

(71) Applicant: SAINT-GOBAIN ISOVER, Courbevoie (FR)

(72) Inventors: Pierre Salomon, Courbevoie (FR); Pierre Millereau, Paris (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 877 days.

(21) Appl. No.: 16/720,746

(22) Filed: Dec. 19, 2019

(65) Prior Publication Data
US 2020/0199022 A1    Jun. 25, 2020

(30) Foreign Application Priority Data
Dec. 20, 2018   (FR) ........................ 1873698

(51) Int. Cl.
*C03C 25/321* (2018.01)
*C03C 13/06* (2006.01)
*E04B 1/74* (2006.01)

(52) U.S. Cl.
CPC ............ *C03C 25/321* (2013.01); *C03C 13/06* (2013.01); *E04B 1/74* (2013.01); *C03C 2213/00* (2013.01); *C03C 2218/112* (2013.01)

(58) Field of Classification Search
CPC ............... C03C 13/06; C03C 2213/00; C03C 2218/112; C03C 25/25; C03C 25/26; C03C 25/321; C08G 65/36; C08K 5/04; C08K 5/053; C08K 5/1545; C08K 7/14; C09J 171/14; E04B 1/74
See application file for complete search history.

(56) References Cited

U.S. PATENT DOCUMENTS 3,480,573 A * 11/1969 Foley ................. B22C 1/26
523/147

FOREIGN PATENT DOCUMENTS

| CN | 102728783 A | 10/2012 | |
|---|---|---|---|
| FR | 2 109 292 A5 | 5/1972 | |
| FR | 2 840 071 A1 | 11/2003 | |
| FR | 3 019 815 A1 | 10/2015 | |
| JP | H11129054 A * | 5/1999 | |
| JP | 2018162430 A * | 10/2018 | ............ C08F 210/14 |
| WO | WO 93/25490 A2 | 12/1993 | |
| WO | WO 94/26676 A1 | 11/1994 | |
| WO | WO 94/26677 A1 | 11/1994 | |
| WO | WO 94/26798 A1 | 11/1994 | |
| WO | WO 2018/167429 A1 | 9/2018 | |

OTHER PUBLICATIONS

Search Report as issued in French Patent Application No. 1873698, dated Aug. 6, 2019.

* cited by examiner

*Primary Examiner* — Shuangyi Abu Ali
(74) *Attorney, Agent, or Firm* — Pillsbury Winthrop Shaw Pittman LLP

(57) ABSTRACT

A binding compound for mineral or organic fibres, includes from 40 to 95 wt % of furan resin, and from 5 to 60 wt % of at least one reducing sugar and/or of at least one non-reducing sugar, relative to the total dry weight of the composition, the binding composition having a dry matter content between 0.5 to 50 wt %.

16 Claims, No Drawings

BINDING COMPOUND BASED ON FURAN RESIN, REDUCING SUGAR AND/OR NON-REDUCING SUGAR

CROSS REFERENCE TO RELATED APPLICATIONS

This application claims priority to French Patent Application No. 1873698, filed Dec. 20, 2018, the entire content of which is incorporated herein by reference in its entirety.

The present invention relates to the field of bonding for thermal and/or acoustic insulation products based on mineral wool, notably glass wool or rock wool, and a formaldehyde-free organic binder.

The invention relates more particularly to a binding compound able to crosslink to form said organic binder, which contains an aqueous solution of furan resin and of reducing sugar and/or non-reducing sugar. It also relates to a method for making insulation products based on mineral or organic fibres bound with a binder using the aforementioned binding compound, as well as the insulating products obtained by said method.

The manufacture of insulation products based on mineral wool generally comprises a step of producing the wool itself, which may be carried out by various methods, for example by the known technique of fibre production by internal or external centrifugation.

Internal centrifugation, more commonly used for making glass wool, consists of introducing the molten mineral material into a centrifuging device comprising a plurality of small orifices, the material being projected towards the peripheral wall of the device under the effect of centrifugal force and leaving it in the form of filaments. At the outlet of the centrifuging device, the filaments are drawn out and entrained towards a receiving unit by a gas stream at high temperature and high velocity, where they form a layer of fibres (or mineral wool).

For its part, external centrifugation consists of pouring the molten material on the external peripheral surface of rotating members called rotors, from where the molten material is ejected under the effect of centrifugal force. Means for drawing out by a gas stream and collecting on a receiving unit are also provided.

To ensure assembly of the fibres together and to give the layer cohesion, a binding compound containing a thermosetting resin is projected onto the fibres, on the path from the outlet of the centrifuging device to the receiving unit. The layer of fibres coated with binding compound undergoes a thermal treatment, at a temperature generally above 100° C., in order to crosslink the resin and thus obtain a thermal and/or acoustic insulation product having specific properties, notably dimensional stability, tensile strength, recovery of thickness after compression, and uniform colour.

The binding compound to be projected onto the mineral wool is generally in the form of an aqueous solution containing the thermosetting resin and additives such as a crosslinking catalyst for the resin, a silane adhesion promoter, an anti-dust mineral oil, etc. Most often the binding compound is applied on the fibres by spraying.

The properties of the binding compound largely depend on the characteristics of the resin. From the standpoint of application, it is necessary for the binding compound to have good sprayability and to be able to be deposited on the surface of the fibres in order to bond them effectively.

The resin must be stable for a given length of time before being used for forming the binding compound, the latter generally being prepared at the moment of use by mixing the resin and the aforementioned additives.

From the regulatory standpoint, the resin must not be harmful, i.e. it should contain—and should generate in the binding step or subsequently—the least possible amount of compounds that may be harmful to human health or the environment.

The thermosetting resins most commonly used for making insulation products based on mineral wool are resins based on formaldehyde (urea-formaldehyde, phenol-formaldehyde, melamine-formaldehyde). These resins are inexpensive, water-soluble and capable of crosslinking in the aforementioned thermal conditions. However, they may still contain a certain proportion of free formaldehyde, the harmful effects of which have been confirmed in toxicological studies. These resins are therefore treated with urea to fix this free formaldehyde in the form of non-volatile condensates. Now, these condensates are unstable in the temperature conditions to which the layers of glass fibres are subjected. They may decompose to formaldehyde and ammonia (itself a product of urea decomposition), which are released into the treatment atmosphere and must therefore undergo capture procedures to reduce their environmental impact. Solutions have therefore been developed for replacing the formaldehyde-based resins in binding compounds.

"Furan" or "polyfuran" resins derived from biomass of vegetable origin are one of the solutions used. These furan resins, initially used in the foundry for ensuring setting of moulding sands in the mould, are used conventionally as binders for mineral fibres for making insulation products based on mineral wool (see for example WO 93/25490, WO 94/26676, WO 94/26677, WO 94/26798). The furan resins described in these documents are mixtures of monomers, oligomers and polymers obtained by polycondensation of monomers with a "furan" nucleus and optionally other comonomers such as anhydrides, aldehydes, ketones, urea, phenol etc., in an acid medium.

Two furan resins are described in more detail notably in WO 94/26677 as being commercial products, namely the products Farez™ M (QO Chemicals), a resin of furfuryl alcohol and urea-formaldehyde containing 6% of residual furfuryl alcohol as well as 0.4 to 1.1% of formaldehyde, and Quacorr™ 1300 (QO Chemicals), a resin obtained by polycondensation of furfuryl alcohol having a residual content of furfuryl alcohol between 2% and 18%.

Another commercially available furan resin is the resin BioRez™ (TransFurans Chemicals, Belgium) obtained by polycondensation of furfuryl alcohol in the presence of an acid catalyst. It has an acid pH between about 4.5 and 5.5, a low furfuryl alcohol content (less than 1% of the commercial aqueous composition) and a viscosity at 25° C. below 1000 mPa·s at 75% of dry extract. This resin has a low residual content of furfuryl alcohol, but an acid catalyst is still necessary for activating its polycondensation.

However, all these resins based on furan resin are expensive, thus making the binding compounds projected onto the fibres and containing these resins very expensive.

The applicant therefore tried to find a harmless biosourced binding compound, which should be inexpensive, while still having good mechanical properties and good crosslinkability.

The idea on which the present invention is based is to replace a part of the furan resins with a less expensive compound in the known binding compounds. It was found that 5 to 60 wt % of at least one reducing sugar and/or of at least one non-reducing sugar in a binding compound comprising from 40 to 95 wt % of furan resin, relative to the total dry weight of the composition, made it possible to reduce the costs of said binding compound while maintaining good mechanical properties and good crosslinkability.

In fact, surprisingly, it was found by the inventors that at least one sugar selected from reducing sugars, non-reducing sugars, and mixtures thereof, in the proportion indicated above, reacted with the furan resin, in contrast to other compounds such as a hydrogenated sugar.

Moreover, the applicant found that the presence of an acid and/or of a base was not necessary in a binding compound as defined above, for forming the polymer network that constitutes the final binder. The binding compound according to the present invention has the advantage of crosslinking, even in the absence of acid and/or base.

Thus, an aspect of the present application relates more precisely to an aqueous binding compound for mineral or organic fibres comprising:

from 40 to 95 wt % of furan resin, and
from 5 to 60 wt % of at least one reducing sugar and/or of at least one non-reducing sugar, the binding composition having a dry matter content between 0.5 to 50 wt %.

In an embodiment, the binding compound comprises from 10 to 50 wt % of at least one reducing sugar and/or of at least one non-reducing sugar and, for example, from 20 to 40 wt %, and, in an embodiment, from 20 to 30 wt % relative to the total dry weight of the composition.

In an embodiment, the binding compound comprises from 50 to 90 wt % of furan resin and, in an embodiment, from 60 to 80 wt %, and, in an embodiment, from 70 to 80 wt % relative to the total dry weight of the composition.

The furan resins according to the invention are well known as binders for glass fibres and are described in the patent applications cited above: WO 93/25490, WO 94/26676, WO 94/26677, WO 94/26798. According to an embodiment of the invention, the furan resin is a furfuryl alcohol resin, called poly(furfuryl alcohol). Poly(furfuryl alcohol) denotes a product of autocondensation of furfuryl alcohol that is in the form of oligomers comprising at least two furan units, if applicable in the form of a mixture of oligomers of variable molecular weight. When the furan resin is a poly(furfuryl alcohol), the residual content of monomeric furfuryl alcohol in the binding compound according to the invention is, in an embodiment, as low as possible. Furfuryl alcohol (CAS number 98-00-0) is in fact a volatile organic compound (VOC), regarded as harmful on skin contact, inhalation and ingestion. The volatility, flammability and toxicity of furfuryl alcohol necessitate precautions in use. Thus, the binding compound of the present invention may contain less than 1.5 wt %, in an embodiment less than 1.0 wt % and ideally less than 0.1 wt % of furfuryl alcohol.

The reducing sugar in the binding compound according to the present invention is a monosaccharide, an oligosaccharide, a polysaccharide or a mixture of these compounds.

As an example of monosaccharide, we may mention glucose, galactose, mannose and fructose.

"Oligosaccharide" means a saccharide containing 2 to 10 monosaccharide units, in an embodiment at most 5.

As an example of oligosaccharide, we may mention lactose, maltose, isomaltose and cellobiose.

The polysaccharides according to the invention are selected from polysaccharides having a number-average molecular weight below 100000, in an embodiment below 50000 and beneficially below 10000.

As an example of a desired polysaccharide, we may mention dextrins. Dextrins are compounds corresponding to the general formula $(C_6H_{10}O_5)_n$ obtained by partial hydrolysis of starch. The methods for preparing dextrins are known. For example, dextrins may be prepared by heating a starch or by drying a starch to dryness, generally in the presence of an acid catalyst, which leads to rupture of the molecules of amylose and amylopectin of which said starch is constituted, into products of lower molecular weight. Dextrins may also be obtained by treating starch enzymatically with one or more amylases, notably microbial, able to hydrolysis the bonds in starch. The type of treatment (chemical or enzymatic) and the hydrolysis conditions have a direct effect on the average molecular weight and the molecular weight distribution of dextrin.

The dextrins according to the present invention have a dextrose equivalent DE above 5, in an embodiment above 30, and in an embodiment above 50.

Conventionally, the dextrose equivalent DE is defined by the following relation:

$$DE = 100 \times \left( \frac{\text{number of glycoside bonds broken}}{\text{number of glycoside bonds in the intitial starch}} \right) \quad \text{[Math. 1]}$$

The dextrins according to the invention may be obtained from starch or from starch derivatives of varied vegetable origin, for example obtained from tubers such as potato, cassava, arrowroot and sweet potato, obtained from grains such as wheat, maize, rye, rice, barley, millet, oat and sorghum, obtained from fruits such as horse chestnut, sweet chestnut, and hazelnut, or obtained from pulses such as pea and bean.

In an embodiment, the reducing sugar is selected from glucose, polysaccharides consisting predominantly (i.e. to more than 50 wt %) of glucose units, and mixtures of these compounds.

In an embodiment, the reducing sugar is glucose or maltose, and beneficially glucose.

The non-reducing sugar according to the present invention denotes a saccharide consisting of several saccharide units in which carbon 1 bearing the hem iacetal OH group is inserted in a bond. A non-reducing sugar in the sense of the invention does not have any reducing action on cuproalkaline solutions.

The non-reducing sugar in the binding compound according to the present invention is a non-reducing oligosaccharide containing at most 10 saccharide units.

As examples of non-reducing sugars of this kind, we may mention disaccharides such as trehalose, isotrehaloses, sucrose, and isosucroses; trisaccharides such as melezitose, gentianose, raffinose, erlose and umbelliferose; tetrasaccharides such as stachyose; and pentasaccharides such as verbascose.

Sucrose and trehalose are favoured, and better still sucrose.

In an embodiment, the binding compound is free from hydrogenated sugars. "Hydrogenated sugar" means all of the products resulting from the reduction, by whatever means, of a sugar selected from monosaccharides, oligosaccharides, linear, branched or cyclic polysaccharides, and mixtures of these products.

In an embodiment, the binding compound is free from formaldehyde, thus providing an alternative to the binding compounds based on resols, as explained above. "Free from formaldehyde" is understood in the present application to mean an amount of formaldehyde of less than 2000 ppm in a binding compound according to the invention. The binding compound is an aqueous composition that has a dry matter content between 0.5 and 50 wt %, in an embodiment between 2 and 30 wt %, and in an embodiment between 4 and 25 wt %; the furan resin and the reducing sugar and/or the non-reducing sugar together beneficially representing at least 50 wt %, in an embodiment at least 75 wt % of the dry matter of the binding compound.

The binding compound according to the invention may further comprise additives as below in the following proportions calculated on the basis of 100 parts by weight of reducing sugar and/or of non-reducing sugar and of furan resin:

0 to 5 parts of silane, in particular aminosilane or epoxysilane,
0 to 25 parts of oil, in an embodiment 4 to 20 parts
0 to 10 parts of a hydrophobic agent, in particular a silicone, and
0 to 30 parts of urea, in an embodiment from 0 to 20 parts.

These additives are normally added at the moment of dilution of the composition, but there is no reason why in principle they should not be added already to the concentrated composition, which will then just need to be diluted with water.

The role of the additives is known and may be recalled briefly: silane is a coupling agent between the fibres and the binder, and also performs the role of anti-ageing agent; oils and in particular mineral oils are anti-dust agents; silicones are hydrophobic agents; urea performs the role of plasticizer and makes it possible to avoid pregelation of the binding compound.

From 0 to 20 parts of polyol may also be added to the binding compound as additive, said polyol may in this case be selected from glycerol, a glycol such as ethylene glycol, propylene glycol, butylene glycol and the poly(alkylene) glycols based on these glycols, or the homopolymers and copolymers of vinyl alcohol. Said polyols may also perform the role of plasticizer and make it possible to avoid pregelation of the binding compound.

The additives beneficially represent at least 5 wt %, in an embodiment at least 10 wt % of the dry matter of the binding compound.

The pH of the aqueous binding compound according to the invention may be between 3.0 and 10.0, in an embodiment between 4.0 and 9.0, in particular between 4.5 and 8.5 and ideally between 5.0 and 7.0.

The pH of the aqueous binding compound may be adjusted, simply by adding an organic base, for example by adding an aqueous solution of ammonia ($NH_4OH$) or an amine, for example a primary or secondary amine. Ammonia and/or primary or secondary amines are used. In an interesting embodiment, the amine is a polyamine comprising from 2 to 5 primary/secondary amine functions, or an amino polymer such as polyethyleneimine.

The applicant was surprised to find that adding such a base to the binding compound had no effect on the rate of crosslinking of the furan resin with the reducing sugar and/or non-reducing sugar and did not alter the mechanical properties of said composition. However, an increase in pH makes it possible to slow, or even stop the increase in viscosity, and transport the resin (formed from furan resin and at least one reducing sugar and/or a non-reducing sugar) in the concentrated form at room temperature and then store it for several weeks in an unrefrigerated environment.

The viscosity of the solution may vary over a wide range. The Brookfield viscosity of the solutions of furan resin and of reducing sugar and/or non-reducing sugar is measured at 25° C. using a Brookfield viscosimeter (according to the method described in standard ASTM D2983), after adjustment of the dry matter content to 50 wt %, in particular to 30 wt % by removing or adding water. In these conditions it is between 1 and 1000 mPa·s, in particular between 2 and 500 mPa·s, in particular between 3 and 100 mPa·s.

The capacity for dilution, or "dilutability", of a concentrated resin solution is defined as the volume of deionized water that it is possible, at a given temperature, to add to one unit of volume of the aqueous solution of resin before permanent turbidity appears. It is generally considered that a resin is usable as binding compound when its dilutability is greater than or equal to 1000%, at 20° C.

The aqueous solution of furan resin and of reducing sugar and/or non-reducing sugar beneficially has a dilutability above 1000%, in an embodiment above 2000%.

In an embodiment, and as explained above, the binding compound is free from base and/or acid such as a polycarboxylic organic acid, or a metal salt of inorganic acid, or an ammonium salt of inorganic acid, or a hypophosphorous acid, or phosphoric acid. In fact, it was found by the inventors, surprisingly, that a reducing sugar and/or a non-reducing sugar do not need acid to react with the furan resin in the binding compound according to the invention.

An aspect of the invention also relates to a method for making an insulation product based on mineral or organic fibres bound with an organic binder, comprising the following steps:

(a) applying a binding compound as described above on mineral or organic fibres,
(b) forming an assembly of mineral or organic fibres,
(c) heating the assembly of mineral or organic fibres until the binding compound hardens.

In an embodiment of the method of the invention, step (a) of applying the binding solution on the mineral or organic fibres may be carried out by spraying by means of spraying nozzles. Application of the binding compound precedes step (b) of assembly, in which the bonded fibres are collected, for example in a mould or on a conveyor before being heated consecutively or extemporaneously for crosslinking and curing the binder.

The binding compound according to the invention may be used for binding mineral or organic fibres, in an embodiment mineral fibres, and, in an embodiment, mineral wool.

The organic fibres may be natural fibres, artificial fibres (i.e. natural fibres that have undergone a chemical modification) or synthetic fibres.

The mineral fibres are in particular glass fibres, notably of glass E, C, R or AR (alkali-resistant), or rock fibres, notably of basalt (or wollastonite). These fibres may be fibres containing more than 96 wt % of silica and ceramic fibres based on at least one oxide, nitride or carbide of metal or of metalloid, or a mixture of these compounds, in particular at least one oxide, nitride or carbide of aluminium, of zirconium, of titanium, of boron or of yttrium. More particularly, the mineral fibres according to the invention are aluminosilicate glass fibres, notably aluminosilicate glass fibres comprising aluminium oxide, $Al_2O_3$, in a fraction by weight between 14% and 28%.

The fibres may be assembled,
into flexible blankets, for example into blankets of mineral wool such as glass wool or rock wool that can be rolled up and are compressible or foldable,
into boards or panels of fibres, more dense and rigid than the blankets that can be rolled up, into moulded fibre-based products, for example linings of pipes or channels, into woven or non-woven textiles, such as non-woven mats of glass fibres or organic fibres.

Step (c) of heating the assembly of fibres is carried out at a temperature between 100° C. and 250° C. for a time between 1 minute and 10 minutes, in an embodiment in a temperature-controlled enclosure, such as a forced-air oven, in which hot gases with controlled temperature are fed into one or more compartments, a microwave oven, or a heating mould with fluid circulation or a heating resistor.

In an embodiment of the method according to the invention, the fibres are mineral fibres and the assembly of mineral fibres has, after the curing step (c), a loss on ignition (LOI) between 1 and 20 wt %, in an embodiment between 1 and 7 wt %.

An aspect of the invention also relates to an insulating product, notably an acoustic and/or thermal insulation product based on mineral or organic fibres bound with an organic binder, obtained by a method as described above. The insulating product obtained therefore comprises mineral or organic fibres and a binder obtained by curing of a binding compound comprising an aqueous solution of furan resin and of reducing sugar and/or non-reducing sugar (as described above). The insulating product according to the invention has a tensile strength and a recovery of thickness after compression that are equivalent to those of an insulating product obtained according to the prior art, that is to say equivalent to an insulating product comprising mineral or organic fibres and a binder obtained by curing of a binding compound comprising a furan resin alone (without sugar(s)).

In an embodiment, the products based on mineral or organic fibres according to the invention are products based on mineral wools which may also be used in soilless culture.

EXAMPLES

Example 1

Aqueous binding compounds are prepared comprising, as furan resin, a furfuryl alcohol resin, called poly(furfuryl alcohol) (BioRez™ (TransFurans Chemicals, Belgium)) with glucose (D-(+)-Glucose 99.5% from Sigma Aldrich). The aqueous binding compounds presented below have a dry matter content of 20 wt %. The amount, i.e. the percentage by weight of poly(furfuryl alcohol) and of glucose, relative to the total dry weight of the composition, is varied in steps of 10%, as indicated in Table 1.

TABLE 1

| Sample name | Percentage of poly(furfuryl alcohol) | Percentage of glucose |
| --- | --- | --- |
| PFA_G_1 | 100 | 0 |
| PFA_G_2 | 90 | 10 |
| PFA_G_3 | 80 | 20 |
| PFA_G_4 | 70 | 30 |
| PFA_G_5 | 60 | 40 |
| PFA_G_6 | 50 | 50 |
| PFA_G_7 | 40 | 60 |
| PFA_G_8 | 30 | 70 |
| PFA_G_9 | 20 | 80 |
| PFA_G_10 | 10 | 90 |
| PFA_G_11 | 0 | 100 |

Two series of glass cloths are impregnated, respectively, with these aqueous binding compounds, then the cloths are passed through a suction device to remove surplus solution. Then the impregnated glass cloths are hardened in an oven thermostatically controlled to 220° C. After baking for 90 seconds and 120 seconds, the tensile breaking strength of a sample is determined. For this, the cloths are cut into strips (300 mm×50 mm) and their ends are inserted in the jaws of a tensile tester. The tensile tester used is an MTS, the load cell is of 2 kN and the jaws use pneumatic clamping.

Table 2 shows the maximum force reached in tension for two baking times (90 seconds and 120 seconds) at a temperature 220° C., of the glass fibre cloths impregnated with a binding compound according to Table 1.

TABLE 2

| Sample name | Baking time | Maximum force in tension (N) |
| --- | --- | --- |
| PFA_G_1 | 90 s | 96.7 |
| PFA_G_1 | 120 s | 92.9 |
| PFA_G_2 | 90 s | 98.3 |
| PFA_G_2 | 120 s | 92.7 |
| PFA_G_3 | 90 s | 92.8 |
| PFA_G_3 | 120 s | 93.4 |
| PFA_G_4 | 90 s | 91.8 |
| PFA_G_4 | 120 s | 89.0 |
| PFA_G_5 | 90 s | 83.6 |
| PFA_G_5 | 120 s | 85.8 |
| PFA_G_6 | 90 s | 76.6 |
| PFA_G_6 | 120 s | 82.5 |
| PFA_G_7 | 90 s | 75.8 |
| PFA_G_7 | 120 s | 72.0 |
| PFA_G_8 | 90 s | 66.6 |
| PFA_G_8 | 120 s | 62.3 |
| PFA_G_9 | 90 s | 48.2 |
| PFA_G_9 | 120 s | 54.6 |
| PFA_G_10 | 90 s | Too low to be measured |
| PFA_G_10 | 120 s | 26.8 |
| PFA_G_11 | 90 s | Too low to be measured |
| PFA_G_11 | 120 s | Too low to be measured |

It can be seen that the samples prepared according to the invention (PFA_G_2 to PFA_G_7) comprising from 10 to 60 wt % of glucose have satisfactory tensile strengths compared to that of the reference sample, which comprises 100 wt % of poly(furfuryl alcohol). However, the tensile mechanical properties of the samples (PFA_G_8 to PFA_G_11) comprising from 70 to 100 wt % of glucose decrease and even become very low, since measurements cannot be carried out on the samples comprising 90% and 100% of glucose respectively (PFA_G_10 and PFA_G_11).

Example 2

Aqueous binding compounds are prepared comprising 60 wt % of poly(furfuryl alcohol) as furan resin ((BioRez™ (TransFurans Chemicals, Belgium)) and 40 wt % of various sugars, relative to the total dry weight of the composition:

reducing sugars such as fructose (D-(−)-fructose from Sigma Aldrich) and maltodextrin ((DE 16.5-19.5) Maldex®Tereos Syral), non-reducing sugar such as sucrose (D(+)-sucrose from Sigma Aldrich) and hydrogenated sugar such as sorbitol (D-sorbitol from Sigma Aldrich).

The aqueous binding compounds shown below have a dry matter content of 20 wt %. The solutions are described in Table 3.

TABLE 3

| Sample name | Sugar used | Percentage of poly(furfuryl alcohol) | Percentage of sugar used |
|---|---|---|---|
| PFA_S_1 | fructose | 60 | 40 |
| PFA_S_2 | maltodextrin (DE 16.5-19.5) | 60 | 40 |
| PFA_S_3 | sucrose | 60 | 40 |
| PFA_S_4 | sorbitol | 60 | 40 |

Table 4 below shows the maximum force reached in tension (measured by the method described in example 1) for two baking times at a temperature of 220° C., of the glass fibre cloths impregnated (like those described in example 1) with a binding compound according to Table 3.

TABLE 4

| | Baking time | Maximum force in tension (N) |
|---|---|---|
| PFA_S_1 | 90 s | 87.7 |
| PFA_S_1 | 120 s | 85.2 |
| PFA_S_2 | 90 s | 108.4 |
| PFA_S_2 | 120 s | 111.7 |
| PFA_S_3 | 90 s | 91.8 |
| PFA_S_3 | 120 s | 92.5 |
| PFA_S_4 | 120 s | 50.1 |
| PFA_S_4 | 300 s | 67.1 |

It can be seen that the samples prepared according to the invention with fructose, maltodextrin and sucrose have satisfactory tensile strengths. Conversely, the use of sorbitol causes a considerable decrease in the mechanical properties of the binding compound in tension, even with a longer baking time (300 seconds).

Example 3

Aqueous binding compounds are prepared comprising the constituents given in Table 5 expressed in parts by weight (in percentage by weight relative to the total dry weight of the composition).

TABLE 5

| Sample name | Reducing sugar used | Percentage of: poly(furfuryl alcohol)[1] (furan resin) | Percentage of sugar used |
|---|---|---|---|
| PFA_P_1 | — | 100 | 0 |
| PFA_P_2 | glucose[2] | 80 | 20 |
| PFA_P_3 | glucose[2] | 60 | 40 |

[1]BioRez ™ (TransFurans Chemicals, Belgium)
[2]Hydrated D-glucose

The binding compounds are prepared by putting the constituents in a vessel containing water, with vigorous stirring. The binding compounds hereunder have a dry matter content of 5 wt %.

The binding compounds are used for forming insulation products based on glass wool.

Glass wool is manufactured by the internal centrifugation technique, in which the molten glass composition is transformed into fibres by means of a tool called a centrifugation spinner, comprising a basket forming the chamber for receiving the molten composition and a peripheral band having a plurality of orifices: the spinner is rotated about its axis of symmetry arranged vertically, the composition is ejected through the orifices under the effect of centrifugal force and the material coming out of the orifices is drawn out into fibres with the assistance of a drawing-out gas stream. The fineness of the glass fibres, measured by their micronaire value in the conditions described in patent application FR 2 840071, is equal to 15.8 l/min. There is a correspondence between the micronaire value and the average diameter of the fibres.

Conventionally, a binding compound spraying ring is arranged underneath the fiberizing spinner so as to distribute the binding compound evenly on the glass wool that has just been formed.

The mineral wool bonded in this way is collected on a belt conveyor having a width of 2.40 m, equipped with internal suction chambers that retain the mineral wool in the form of a felt or a layer on the surface of the conveyor. The conveyor then circulates in an oven maintained at 240° C. where the constituents of the binding compound polymerize to form a binder. The insulating product obtained has a density equal to 17.5 kg/m³, a thickness of about 80 mm immediately after manufacture and a loss on ignition equal to 4.7%.

In this example, the tensile strength is measured, according to standard ASTM C 686-71T, on a sample punched out of the insulating product. The sample is in the shape of a torus 122 mm long, 46 mm wide, with a radius of curvature of the cut-out from the outer edge equal to 38 mm and a radius of curvature of the cut-out from the inner edge equal to 12.5 mm.

The sample is arranged between two cylindrical mandrels of a testing machine, one of which is movable and moves at a constant speed. The breaking force F of the sample is measured and the tensile strength TS is calculated, defined by the ratio of the breaking force F (in newton) to the mass of the sample (in newton/gram). The tensile strength is measured immediately after manufacture (initial tensile strength).

"Recovery of thickness" indicates the elasticity in compression of the end product. To measure it, a pressure of compression is applied for a given time, such that the thickness is reduced to 1/4.8 of its initial value. After releasing this pressure of compression, the thickness is measured again. The recovery of thickness is the ratio of the thickness measured after releasing the pressure of compression to the initial thickness.

The properties of the insulation products are given in the table.

TABLE 6

| Sample name | Tensile strength (N/g) | Recovery of thickness (cm) |
|---|---|---|
| PFA_P_1 | 4.09 | 107.95 |
| PFA_P_2 | 4.36 | 108.55 |
| PFA_P_3 | 3.53 | 110.31 |

It can be seen that the insulating products prepared according to the invention (PFA_P_2 and PFA_P_3) have tensile strength and recovery of thickness equivalent to those of the reference sample (PFA_P_1).

Example 4

The procedure described in example 3 if followed, but using dextrose as the reducing sugar. Tables 7 and 8 specify the fractions by weight of the binding to compounds used and the mechanical properties of the samples of mineral wool obtained.

TABLE 7

| Sample name | Reducing sugar used | Percentage of: poly (furfuryl alcohol)[1] (furan resin) | Percentage of sugar used |
|---|---|---|---|
| PFA_P_4 | — | 100 | 0 |
| PFA_P_5 | dextrose[2] | 60 | 40 |

[1]BioRez ™ (TransFurans Chemicals, Belgium)
[2]dextrose monohydrate from Roquette

TABLE 8

| Sample name | Tensile strength (N/g) | Recovery of thickness (cm) |
|---|---|---|
| PFA_P_4 | 4.45 | 105.66 |
| PFA_P_5 | 4.06 | 108.11 |

It can be seen that the insulating product prepared according to the invention (PFA_P_5) has tensile strength and recovery of thickness equivalent to that of the reference sample (PFA_P_4).

The invention claimed is:

1. Aqueous binding composition for mineral or organic fibres comprising:
   from 40 to 95 wt % of poly(furfuryl alcohol) resin, and
   from 5 to 60 wt % of at least one dextrin having a dextrose equivalent (DE) of at least 55 and/or of at least one non-reducing sugar, relative to a total dry weight of the aqueous binding composition,
   said aqueous binding composition, which is adapted to bind the mineral or organic fibres, having a dry matter content between 0.5 to 50 wt %.

2. The aqueous binding composition according to claim 1, comprising from 10 to 50 wt % of the at least one dextrin having a dextrose equivalent (DE) of at least 55 and/or of the at least one non-reducing sugar relative to the total dry weight of the aqueous binding composition.

3. The aqueous binding composition according to claim 2, comprising from 20 to 30 wt % of the at least one dextrin having a dextrose equivalent (DE) of at least 55 and/or of the at least one non-reducing sugar relative to the total dry weight of the aqueous binding composition.

4. The aqueous binding composition according to claim 1, wherein the at least one non-reducing sugar is trehalose, an isotrehalose, sucrose, an isosucrose, melezitose, gentianose, raffinose, erlose, umbelliferose, stachyose or verbascose.

5. The aqueous binding composition according to claim 4, wherein the at least one non-reducing sugar is sucrose.

6. The aqueous binding composition according to claim 1, wherein the aqueous binding composition is free from hydrogenated sugars.

7. The aqueous binding composition according to claim 1, wherein the aqueous binding composition has a dry matter content between 2 and 30 wt %; the poly(furfuryl alcohol) resin and the at least one dextrin having a dextrose equivalent (DE) of at least 55 and/or at least one non-reducing sugar together representing at least 50 wt % of the dry matter of the aqueous binding composition.

8. The aqueous binding composition according to claim 1, wherein the aqueous binding composition has a pH between 3.0 and 10.0.

9. The aqueous binding composition according to claim 1, further comprising the additives given hereunder in the following proportions calculated on a basis of 100 parts by weight of the at least one dextrin having a dextrose equivalent (DE) of at least 55 and/or of the at least one non-reducing sugar and of poly(furfuryl alcohol) resin:
   0 to 5 parts of silane,
   0 to 25 parts of oil,
   0 to 10 parts of a hydrophobic agent, and
   0 to 30 parts of urea.

10. A method for making an insulation product based on mineral or organic fibres bound with an organic binder, comprising:
   (a) applying the aqueous binding composition according to claim 1 on mineral or organic fibres,
   (b) forming an assembly of mineral or organic fibres,
   (c) heating the assembly of mineral or organic fibres until said binding composition hardens.

11. The method according to claim 10, wherein said aqueous binding composition in step a) is applied on the mineral or organic fibres by spraying by means of spraying nozzles.

12. The method according to claim 10, wherein the assembly of mineral or organic fibres is a blanket of fibres, a board or a panel of fibres, a fibre-based moulded product, or a woven or non-woven textile.

13. The method according to claim 10, wherein step (c) comprises heating said assembly of fibres at a temperature between 100° C. and 250° C. for a time between 1 and 10 minutes.

14. The method according to claim 10, wherein the fibres are mineral fibres and the assembly of mineral fibres has, after the curing step (c), a loss on ignition (LOI) between 1 and 20 wt %.

15. The aqueous binding composition according to claim 1, wherein the dextrose equivalent (DE) is at least 60.

16. The aqueous binding composition according to claim 1, comprising from 50 to 95 wt % of poly(furfuryl alcohol) resin.

* * * * *